United States Patent [19]
Orlando

[11] 3,710,051
[45] Jan. 9, 1973

[54] ACCELERATION RESPONSIVE SENSOR

[75] Inventor: Vincent A. Orlando, Greendale, Wis.

[73] Assignee: General Motors Corporation, Detroit, Mich.

[22] Filed: July 23, 1971

[21] Appl. No.: 165,533

[52] U.S. Cl. ........................................200/61.45 R
[51] Int. Cl. ..............................................H01h 35/02
[58] Field of Search........................200/61.45–61.53, 200/61.45 R; 340/261, 262

[56] References Cited

UNITED STATES PATENTS

| | | | |
|---|---|---|---|
| 2,311,637 | 2/1943 | Buchanan | 200/61.49 |
| 2,850,291 | 9/1958 | Ziccardi | 200/61.51 X |
| 3,281,551 | 10/1966 | Becke | 200/61.45 R |
| 3,336,045 | 8/1967 | Kobori | 200/61 X |
| 3,410,359 | 11/1968 | Mollison | 180/103 |
| 3,647,999 | 3/1972 | Mazelsky | 200/61.45 R |
| 3,556,556 | 1/1971 | Goetz | 200/61.45 X |
| 3,160,868 | 12/1964 | Kowanda | 200/61.45 R |
| 3,619,524 | 11/1971 | Gillund | 200/61.45 M |

*Primary Examiner*—Robert K. Schaefer
*Assistant Examiner*—M. Ginsburg
*Attorney*—W. E. Finken et al.

[57] ABSTRACT

A sensor includes an elongated housing having a sector shaped recess defined by angularly diverging walls. One end portion of a spring member of predetermined elastic characteristics is secured to the housing to locate the undeflected axis of the member at an angle to an axis of the housing. The undeflected axis of the spring member intersects the plane of the recess to the proximal side of the recess. The other end of the spring member mounts a cylindrical mass engaging the walls of the recess adjacent their proximal ends to bow the unsecured portion of the spring member and create a preload force on the mass. An electrical contact finger is located at the distal end of the recess. When the mass receives an acceleration pulse of predetermined amplitude and time, the preload force is overcome and the mass moves into wiping engagement with the contact finger to close a circuit across a source of power and a mechanism to be actuated.

4 Claims, 4 Drawing Figures

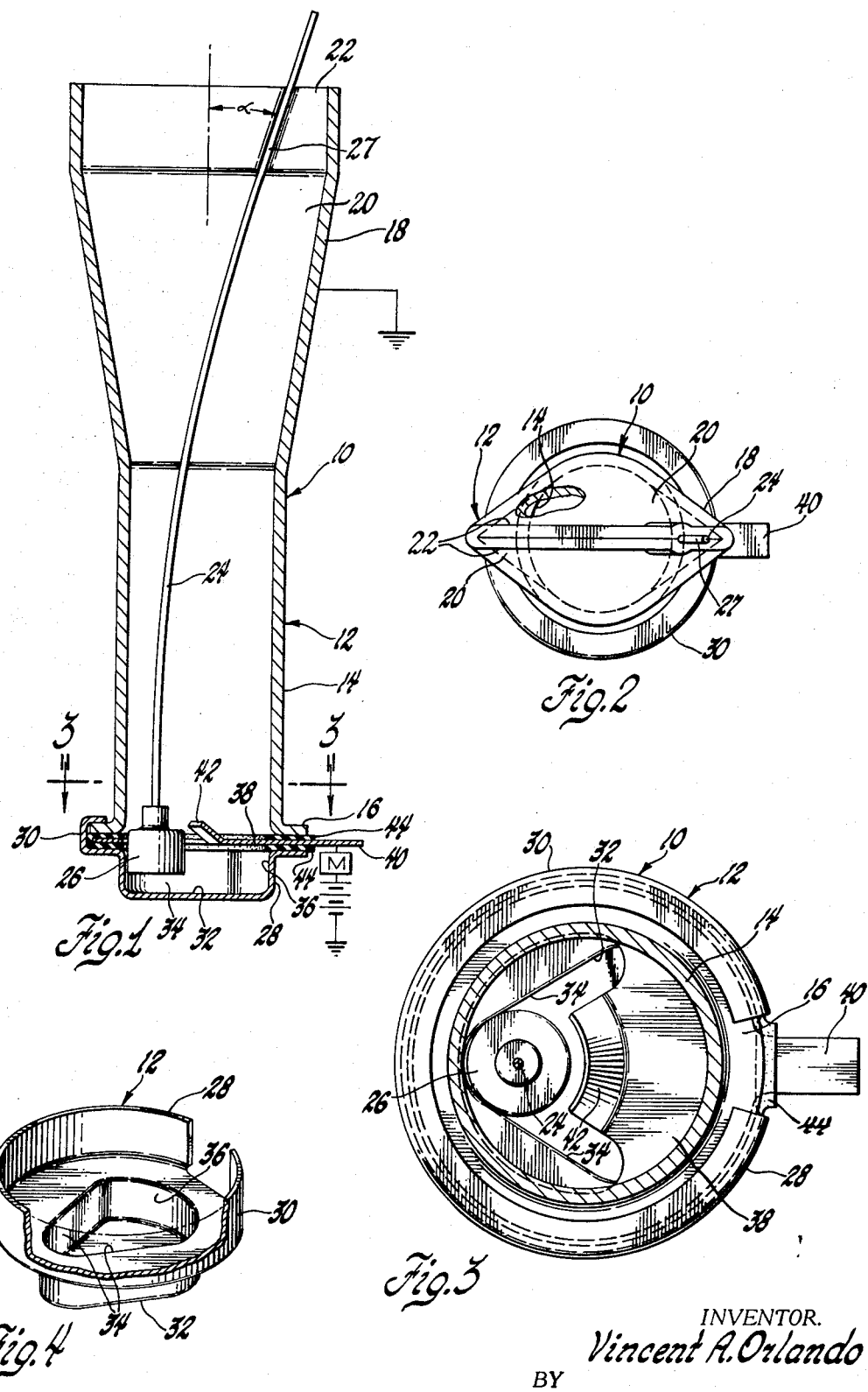

ACCELERATION RESPONSIVE SENSOR

This invention relates generally to sensors and more particularly to sensors of the pendulum type wherein a seismic mass is suspended by a spring rod for movement to an actuated position when subjected to an acceleration pulse greater than a predetermined amplitude and time.

Known pendulum-type sensors locate the suspended seismic mass in unactuated position against movement either by gravity or by use of a magnet applying a preload force to the mass. In those sensors which use gravity, various adjustable devices which surround the spring rod are employed to limit swinging movement of the rod. Such devices do not permit accurate calibration of the sensor.

While the sensor of this invention is of the pendulum type, it differs from known sensors in that the spring rod is mounted in a bowed condition intermediate the ends thereof to thereby apply an integral resilient bias to the mass holding the mass in unactuated position unless such bias is overcome by an acceleration pulse greater than a predetermined amplitude and time.

In the preferred embodiment of the invention, the upper end portion of a spring rod is mounted at a predetermined included angle to the axis of a tubular housing. The lower end of the spring rod mounts the seismic mass which engages a portion of the housing to bow the rod and hold the mass in unactuated position against movement to actuated position in engagement with a contact to close a circuit across a source of power and a mechanism to be actuated. The contact includes a generally nondeflectable angular finger. The mass engages and slides along the finger toward the proximal end thereof over a specified time due to the elastic characteristics of the wire, the bowing of the rod, and the angle of the contact finger. This avoids contact bounce. The sensor is thus of very simple construction and the threshold value thereof can be changed as necessary by varying the spring rate of the rod, the angular inclination of the upper end portion of the rod to the axis of the housing, the weight of the mass, or the inclination of the housing to the horizontal.

One feature of this invention is that it provides a sensor having a seismic mass suspended within a housing by securement to one end of a spring rod of predetermined elastic characteristics, the other end of which is mounted on the housing in a manner to bow the rod intermediate the ends thereof and thereby provide an integral resilient biasing force on the mass maintaining the mass in unactuated position and against movement toward an actuated position unless the mass receives an acceleration pulse greater than a predetermined amplitude and time. Another feature is that the other end of the rod is mounted on the housing at a predetermined angle to the axis of a tubular portion of the housing engaged by the mass. A further feature of this invention is that the mass moves within a sector-shaped recess of the housing between an unactuated position in engagement with the angular side walls of the recess adjacent their proximal ends to an actuated position in engagement with a spring finger contact mounted on the housing between the distal ends of the walls. Yet another feature is that the spring finger contact is generally nondeflectable and the mass slides along the contact toward its proximal end over a specified time to avoid contact bounce.

These and other features of the invention will be readily apparent from the following specification and drawings wherein:

FIG. 1 is an elevational sectional view of a sensor according to this invention;

FIG. 2 is a top plan view;

FIG. 3 is an enlarged sectional view taken generally along the plane indicated by line 3—3 of FIG. 1; and FIG. 4 is a partially broken away perspective view of the sector-shaped recess of the housing.

Referring now to the drawings, a sensor designated generally 10 according to this invention includes a housing 12. The housing 12 includes a lower cylindrical portion 14 having a radially extending terminal flange 16 at the lower free end thereof. The upper portion 18 of the housing 12 is generally of outwardly flaring rhombic cross section as can be seen from FIG. 2. The major axis of the upper portion is coplanar with the axis of portion 14. The upper portion 18 has its upper side walls 20 extending angularly inwardly toward the major axis thereof and provided with pinchweld flanges 22 which are secured to each other.

A deflectable spring rod 24 of predetermined elastic characteristics mounts a cylindrical seismic mass 26 at its lower end. As can be seen in FIGS. 1 and 2, a linear upper end portion 27 of the spring rod 24 extends outwardly from between the flanges 22 and is clamped therebetween at a predetermined included angle $\alpha$ to the axis of the lower portion 14 of the housing 12. In the specific embodiment shown, the included angle $\alpha$ between this upper end portion and such axis is 20°.

A cup-shaped member 28 of housing 12 includes a discontinuous axially extending flange 30 and an integral sector-shaped embossed recess 32 having angularly related side walls 34 arcuately joined adjacent their proximal ends and joined by an arcuate end wall 36 at their distal ends. A centrally apertured cylindrical contact 38 includes an electrical connection tab 40 and an integral angled generally nondeflectable finger 42. Annular washers 44 enclose the peripheral portion of the contact 38 to insulate the contact from housing 12. The contact 38 and washers 44 seat within member 28, with tab 40 extending through the opening of flange 30. The aperture of contact 38 is generally coterminous with walls 34. However, a portion of the contact and finger 42 overlie wall 36 and recess 32. The member 28 is secured to the flange 16 by hemming flange 30 over flange 16. This also assembles the contact 38 to the sensor. The sector-shaped recess 32 is located with its bisector coplanar with the curved spring rod 24 and with the major axis of the housing upper portion 18. The seismic mass 26 is received within recess 32 in tangential engagement with the walls 34 of the recess adjacent their proximal ends as shown in FIG. 3. This engagement of the mass bows the rod 24 between its linear upper end portion 27 and its lower end to provide an integral biasing force holding the mass 26 in its unactuated position shown in FIGS. 1 and 3.

As shown in FIG. 1, the sensor 10 is connected across a source of power and a mechanism M which is to be controlled by the sensor. The sensor of this invention is particularly intended for use with an occupant restraint system which includes a source of pressure fluid for inflating an occupant restraint cushion upon command of the sensor. The sensor senses acceleration pulses applied to the vehicle body and when a pulse greater than a predetermined amplitude and time is received, the mass 26 moves to actuated position in engagement with the contact finger 42 to close the circuit across the source of power and the mechanism M. Such mechanism can be electrically fired detonators which explosively rupture the seal of a pressure vessel, an igniter of a gas generator, or otherwise.

When the mass moves to actuated position, the upper peripheral edge thereof engages the contact finger 42 adjacent its distal end to close the circuit. After the initial engagement of the mass with the finger 42, it slides along the finger 42 toward the distal end of the finger over a specified time due to the elastic characteristics of the rod 24, the bowing of this rod, and the angle of the finger 42 with the horizontal. This avoids contact bounce and arrests movement of mass 26 before it engages wall 36. It also applies a downward force on the rod 24 to place it in tension and avoid possible deformation thereof and loss of calibration. Although only one contact finger 42 is shown, it will be understood that the one finger can be separated into a series of adjacent tapered spring fingers if so desired.

The included angle between the walls 34 of the recess 32 is 60°. Such angle may vary in accordance with the intended zone of response of the sensor and may be set in a manner disclosed and claimed in copending application Ser. No. 173,806 Brooks et al., filed Aug. 23, 1971.

The threshold level of the subject sensor is dependent, of course, on the weight of the mass 26, the spring rate of the rod 24, the included angle $\alpha$ between the upper end portion 27 of this rod and the axis of the tubular portion 14 of the housing 12, and the inclination of the axis of portion 14 to the horizontal. Such factors may be varied as desired to obtain the desired threshold level of the sensor.

Although the sensor is shown in a vertical position, it should be noted that it can be mounted in a horizontal position as well as in various positions angular to the horizontal depending on the degree of influence of the earth's gravity which is intended to be included in the function of the sensor. It should also be noted that the mass 26 moves through a small travel distance from its unactuated position shown in FIG. 1 to its actuated position in engagement with the contact finger 42.

From the foregoing description, it can be seen that the subject sensor is of very simple construction and that no magnets are required to hold the mass 26 in unactuated position until the threshold level of the sensor is exceeded. Further, no adjustable rings or other devices surrounding the spring rod 24 are required for this purpose. The sensor is calibrated during its manufacture and thereafter no changes are necessary.

Thus, this invention provides an improved sensor.

I claim:

1. A sensor comprising, in combination, an elongated housing, a normally linear elongated spring member of predetermined elastic characteristics, a mass secured to the spring member adjacent one end thereof, means securing a portion of the spring member adjacent the other end thereof to the housing and locating the undeflected axis of the spring member at a predetermined included acute angle to an axis through the housing, abutment means on the housing spaced from the housing axis and slidably engaged by the mass to deflect the unsecured portion of the spring member relative to the undeflected longitudinal axis of the spring member and bow the spring member intermediate the securing means and the mass, the bowing of the spring member creating a predetermined preload force biasing the mass into engagement with the abutment means, and contact finger means mounted on the housing a predetermined distance from the abutment means, the mass moving into wiping engagement with the contact means when subjected to a predetermined force to control the operation of a mechanism connected across the mass and contact means and a source of power.

2. A sensor comprising, in combination, a support including a generally planar recess having a pair of angularly diverging walls, a normally linear elongated spring member of predetermined elastic characteristics, a mass of predetermined weight secured to the spring member adjacent one end thereof for movement within the recess, contact finger means mounted on the support and located intermediate the distal ends of the walls, means securing a portion of the spring member adjacent the other end thereof to the support and locating the undeflected longitudinal axis of the spring member at an acute angle to the plane of the recess and intersecting such plane to the proximal side of the recess, the mass slidably engaging the walls of the recess adjacent the proximal ends thereof and deflecting the unsecured portion of the spring member relative to said undeflected axis to bow the spring member intermediate the securing means and the mass, the bowing of the spring member creating a predetermined preload force holding the mass against movement within the recess into wiping engagement with the contact finger means unless subjected to a predetermined force, and a source of power connected across the mass and contact means and a mechanism to be operated thereby, the engagement of the mass and contact means controlling the operation of the mechanism by the source of power.

3. A sensor comprising, in combination, a support including a generally planar recess having a pair of angularly diverging walls, a normally linear elongated spring member of predetermined elastic characteristics, an annular mass of predetermined weight secured to the spring member adjacent one end thereof for movement within the recess, contact means mounted on the support and including at least one contact finger intermediate the distal ends of the walls, means securing a portion of the spring member adjacent the other end thereof to the support and locating the undeflected longitudinal axis of the spring member at an acute angle to the plane of the recess and intersecting such plane to the proximal side of the recess, the mass slidably engaging the walls of the recess adjacent the proximal ends thereof and deflecting the unsecured portion of the spring member relative to said undeflected axis to bow the spring member intermediate the securing means and the mass, the bowing of the spring member creating a predetermined preload force holding the mass against movement within the recess to actuated position unless the mass is subjected to a predetermined force, one end of the mass moving into wiping engagement with the contact finger in actuated position, and a source of power connected across the mass and contact finger and a mechanism to be operated thereby, the wiping engagement of the mass and contact finger controlling the operation of the mechanism by the source of power.

4. A sensor comprising, in combination, a vertical support, a normally linear elongated spring member of predetermined elastic characteristics, first contact means of predetermined weight secured to the spring member adjacent one end thereof, means securing a portion of the spring member adjacent the other end thereof to the support and locating the undeflected axis of the spring member at a predetermined angle to the vertical, second contact means mounted on the support a predetermined distance from the undeflected longitudinal axis of the spring member, abutment means on the support located intermediate said undeflected axis and said second contact means, the unsecured portion of the spring member slidably engaging the abutment means and deflecting the unsecured portion of the spring member away from said undeflected axis to bow the spring member intermediate the securing means and the one end thereof, the bowing of the spring member creating a predetermined preload force holding the first contact means against movement into engagement with the second contact means unless subjected to a predetermined force, and a source of power connected across the first and second contact means and a mechanism to be operated thereby, the engagement of the first and second contact means controlling the operation of the mechanism by the source of power.

* * * * *